US009540972B2

(12) United States Patent
Hanley et al.

(10) Patent No.: US 9,540,972 B2
(45) Date of Patent: Jan. 10, 2017

(54) ARTICLE HAVING IMPACT RESISTANT SURFACE

(75) Inventors: Stephen Hanley, Lebanon, NJ (US); Chul S. Lee, Northville, MI (US); Richard J. Lair, Long Valley, NJ (US); Marianne S. Morgan, Rochester Hills, MI (US); Randy Fleck, Nazareth, PA (US)

(73) Assignee: BASF SE, Ludwigshafen (DE)

( * ) Notice: Subject to any disclaimer, the term of this patent is extended or adjusted under 35 U.S.C. 154(b) by 1125 days.

(21) Appl. No.: 13/465,530

(22) Filed: May 7, 2012

(65) Prior Publication Data

US 2012/0251788 A1 Oct. 4, 2012

Related U.S. Application Data

(63) Continuation-in-part of application No. 12/133,713, filed on Jun. 5, 2008, now abandoned.

(Continued)

(51) Int. Cl.

*B32B 3/30* (2006.01)
*F16N 31/00* (2006.01)

(Continued)

(52) U.S. Cl.

CPC .... *F01M 11/0004* (2013.01); *F01M 2011/002* (2013.01); *F01M 2011/0091* (2013.01); *F02F 7/00* (2013.01); *Y10T 428/2457* (2015.01)

(58) Field of Classification Search

CPC .................... Y10T 428/2457; F01M 11/0004; F01M 2011/002; F01M 2011/091; F02F 7/00

See application file for complete search history.

(56) References Cited

U.S. PATENT DOCUMENTS

| | | | | |
|---|---|---|---|---|
| 2,690,193 A * | 9/1954 | Smith | F16L 55/172 138/99 |
| 3,449,482 A | 6/1969 | Mitchell et al. | |

(Continued)

FOREIGN PATENT DOCUMENTS

| | | |
|---|---|---|
| CA | 1069298 A1 | 1/1980 |
| DE | 38 30 966 C1 | 5/1989 |

(Continued)

OTHER PUBLICATIONS

European Search Report for Application EP 08 15 9840 dated Oct. 4, 2011.

(Continued)

*Primary Examiner* — Donald J Loney
(74) *Attorney, Agent, or Firm* — Howard & Howard Attorneys PLLC

(57) ABSTRACT

An article manufactured from a polymeric material filled with fibers has an exterior surface having an impact portion with an arcuate configuration to impart impact resistance to the article. The article also includes a plurality of ribs orientated and configured in a unique manner to also impart impact resistance to the article. The ribs extend from the exterior surface of the article. A fillet having a fillet radius interconnects the ribs and the exterior surface. The fibers of the polymeric material are aligned within the article parallel to a flow of the polymeric material when injected into a mold during a molding process. The ribs are oriented in a pattern relative to the fibers to maximize the impact resistance of the article.

49 Claims, 9 Drawing Sheets

Related U.S. Application Data

(60) Provisional application No. 60/942,521, filed on Jun. 7, 2007.

(51) Int. Cl.

| | |
|---|---|
| ***F01M 11/00*** | (2006.01) |
| *F02F 7/00* | (2006.01) |

(56) References Cited

U.S. PATENT DOCUMENTS

| | | | | |
|---|---|---|---|---|
| 3,941,157 | A | 3/1976 | Barnett | |
| 4,105,236 | A | 8/1978 | Haar | |
| 4,930,469 | A | 6/1990 | Kamprath et al. | |
| 5,934,241 | A | 8/1999 | Von Esebeck et al. | |
| 6,131,543 | A | 10/2000 | Achenbach et al. | |
| 6,523,561 | B2 | 2/2003 | Kapcoe et al. | |
| 6,539,912 | B1 | 4/2003 | Beer | |
| 6,584,950 | B1 | 7/2003 | Cunningham | |
| 6,588,557 | B2 | 7/2003 | Williams et al. | |
| 6,705,270 | B1 | 3/2004 | Rau et al. | |
| 2002/0100641 | A1* | 8/2002 | Osman ............... | F01M 11/0004 184/106 |
| 2004/0200452 | A1* | 10/2004 | Higashide ............... | F02B 75/20 123/195 A |

FOREIGN PATENT DOCUMENTS

| | | | |
|---|---|---|---|
| DE | 19619977 | C2 | 7/1998 |
| DE | 10026113 | A1 | 11/2001 |
| DE | 60124084 | T2 | 2/2007 |
| EP | 1 253 299 | A2 | 10/2002 |
| EP | 1 498 598 | A1 | 1/2005 |
| EP | 1731725 | A2 | 12/2006 |
| JP | 2003-001030 | A | 1/2003 |
| JP | 2005-271816 | A | 10/2005 |

OTHER PUBLICATIONS

English language abstract not found for DE 38 30 966; however, see English language equivalent U.S. Pat. No. 4,930,469. Original document extracted from espacenet.com database on May 30, 2014, 6 pages.

English language abstract and machine-assisted English translation for EP 1 253 299 extracted from espacenet.com database on May 30, 2014, 25 pages.

English language abstract and machine-assisted English translation for EP 1 498 598 extracted from espacenet.com database on May 30, 2014, 28 pages.

English language abstract and machine-assisted English translation for JP 2003-001030 extracted from PAJ database on May 30, 2014, 29 pages.

English language abstract and machine-assisted translation for DE 10026113 extracted from the espacenet.com database on Jul. 10, 2012, 8 pages.

English language abstract not available for DE 19619977; However, see English language equivalent U.S. Pat. No. 5,934,241. Original document extracted from the espacenet.com database on Jul. 10, 2012, 10 pages.

English language abstract not available for DE 60124084; However, see English language equivalent U.S. Pat. No. 6,705,270. Orginal document extracted from the espacenet.com database on Jul. 10, 2012, 11 pages.

English language abstract and machine-assisted translation for JP 2005-271816 extracted from the PAJ database on Jul. 10, 2012, 33 pages.

Dupont, Design Guide—Module 1, General Design Principles for Dupont Engineering Polymers, Copyright 2000, E.I. du Pont de Nemours and Company, 136 pages.

* cited by examiner

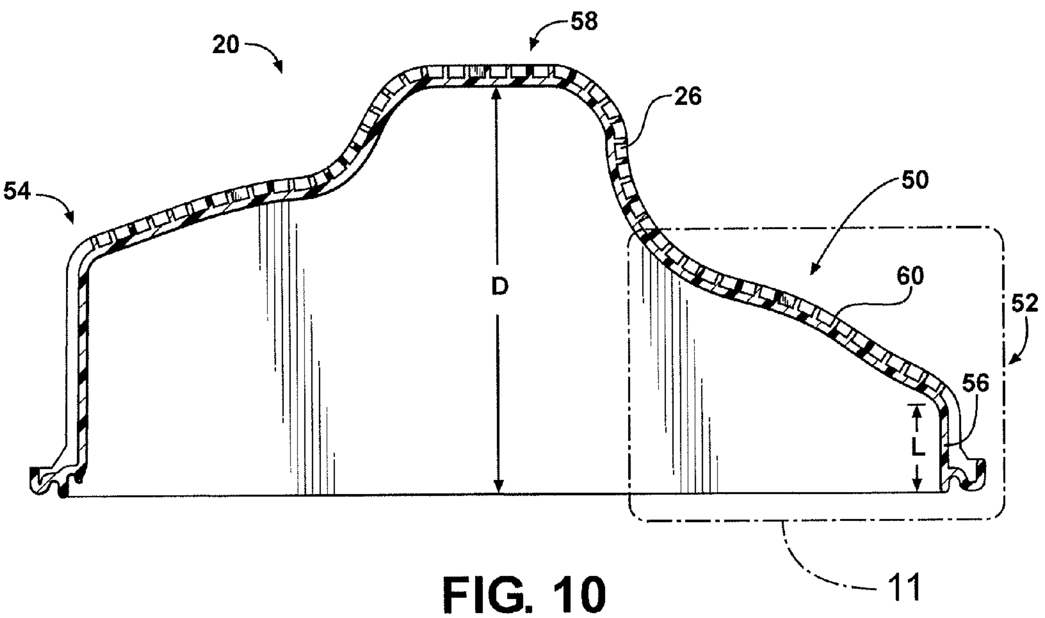
FIG. 10
FIG. 11
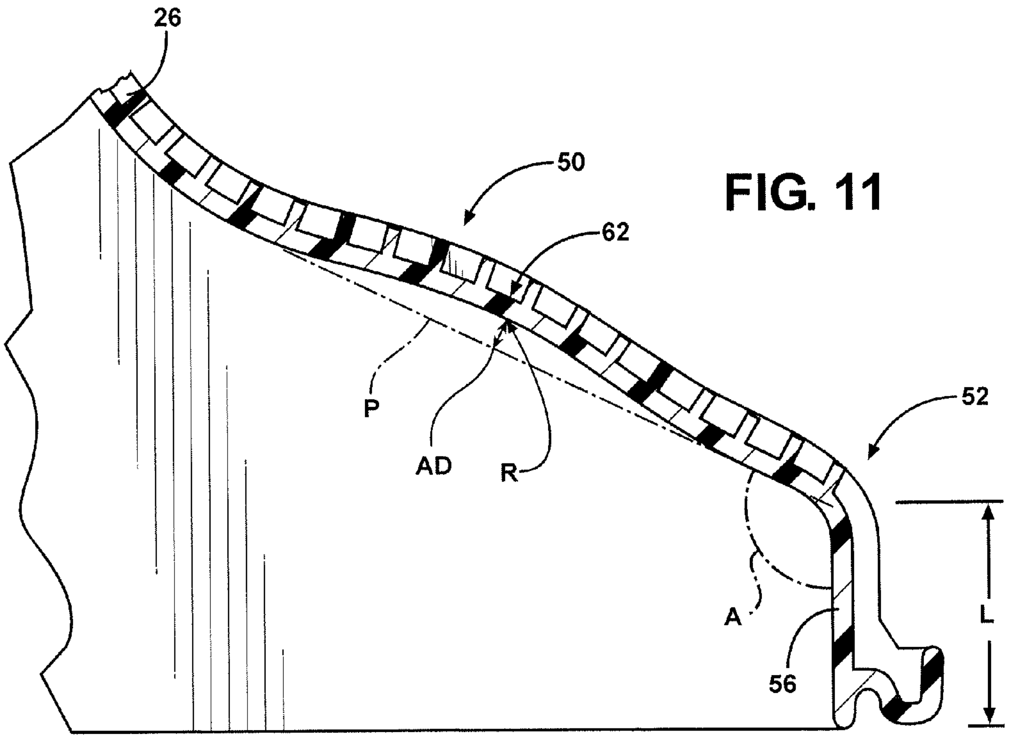

ARTICLE HAVING IMPACT RESISTANT SURFACE

CROSS REFERENCE TO RELATED APPLICATION

This application is a continuation-in-part of U.S. patent application Ser. No. 12/133,713, filed Jun. 5, 2008, which claims priority to U.S. Provisional Patent Application Ser. No. 60/942,521, filed Jun. 7, 2007.

BACKGROUND OF THE INVENTION

1. Field of the Invention

The subject invention generally relates to an article having an impact resistant surface for preventing damage to the article upon impact by an object.

2. Description of the Related Art

With the increased cost of metals, such as aluminum and steel, various articles previously manufactured from metals such as steel, cast aluminum, and steel/plastic composites are now being manufactured from a polymeric material. The articles are not only less expensive to produce from the polymeric material, but also reduce mass. However, the article must meet predetermined design requirements. The design requirements include impact resistance, i.e., the articles must still be capable of withstanding an impact from an object without fracturing. As such, the polymeric material is typically filled with glass fibers to increase the strength of the article. In order to meet the required impact resistance, longitudinally extending ribs are typically incorporated into an exterior surface of the article. The ribs are exposed to the impact from the object. These longitudinally extending ribs are integrally formed with the article, and extend in parallel rows along a length of the article. The ribs increase the geometric strength (rigidity) of the article, i.e., the ribs increase resistance to bending or flexing.

The glass fibers typically align themselves with a direction of flow of the polymeric material as the article is being formed, i.e., the glass fibers align with the direction of flow of the polymeric material being injected into a mold. A strength of the article comprising the glass fibers is greatest when a load is applied in the direction of the orientation of the glass fibers, i.e., parallel to the orientation of the glass fibers, and is least when the loading is applied in a direction perpendicular to the orientation of the glass fibers. A resistance to elongation of the article is least when the loading is applied in the direction of the orientation of the glass fibers, i.e., parallel to the orientation of the glass fibers, and is greatest when the loading is applied in a direction perpendicular to the orientation of the glass fibers. Therefore, the resistance to elongation acts opposite the strength, with the resistance to elongation of the article being highest when the loading is applied perpendicular to the orientation of the glass fibers in the article and the strength of the article being highest when the loading is applied parallel to the orientation of the glass fibers in the article.

The overall impact resistance of the article is dependent upon both the strength and the resistance to elongation of the article. Therefore, a longitudinal rib pattern in which the ribs are aligned parallel with the orientation of the glass fibers in the article maximizes the bending strength, but minimizes the resistance to elongation, whereas a longitudinal rib pattern in which the ribs are aligned perpendicular with the orientation of the glass fibers in the article minimizes the bending strength and maximizes the resistance to elongation.

An example of an article previously manufactured from steel that is now manufactured from the polymeric material is an oil pan (fluid reservoir) for an internal combustion engine. The longitudinal ribs run substantially along the entire length of the oil pan, such that the longitudinal ribs extend along a longitudinal axis of a vehicle and parallel with a direction of travel of the vehicle. As such, the object, for example a stone or some other debris, will most likely be traveling in a direction parallel the longitudinal ribs.

As known in the prior art, each of the longitudinal ribs include a pair of side surfaces in spaced parallel relationship defining a generally rectangular cross section. Each of the longitudinal ribs extends upward from an exterior surface of the oil pan, with the sidewalls intersecting the exterior surface at an inner corner, i.e., a vertex having an approximate angle of 90°. In other words, the ribs are substantially perpendicular to the exterior surface of the oil pan. Upon impact by the object, the substantially perpendicular intersection between the side surfaces of the ribs and the exterior surface of the oil pan creates a concentrated stress point in the exterior surface of the oil pan at the vertex of the inner corner. While the longitudinal ribs increase the impact resistance of the oil pan, the oil pan remains susceptible to fracture at these concentrated stress points located at the intersections of the side surfaces of the longitudinal ribs and the exterior surface of the oil pan. Accordingly, there remains a need to further increase the impact resistance of these various articles.

SUMMARY OF THE INVENTION AND ADVANTAGES

The subject invention provides an impact resistant article. The article comprises an exterior surface having an impact portion disposed between a leading portion and a trailing portion. A plurality of ribs extends outwardly from the exterior surface. The plurality of ribs includes a pair of side surfaces in spaced parallel relationship. The pair of side surfaces is perpendicular to the exterior surface. A fillet interconnects the exterior surface and each of the pair of side surfaces. The impact portion of the exterior surface defines an arcuate configuration protruding outwardly imparting impact resistance to the impact portion.

Accordingly, the subject invention employs the arcuate configuration of the impact portion of the exterior surface for deflecting the object thereby increasing the impact resistance of the article by minimizing an impact force transferred to the exterior surface of the article. Additionally, the fillets connecting the ribs to the exterior surface spreads the impact force transferred to the impact portion of the exterior surface of the article, which also increases the impact resistance of the article.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 10 is a cross section of the article of FIG. 9 taken along line 10-10 shown in FIG. 9; and FIG. 11 is a enlarged cross section of a portion of the article of FIG. 10 showing an impact portion of the exterior surface having an arcuate configuration;

DETAILED DESCRIPTION OF THE INVENTION

Figure 1:
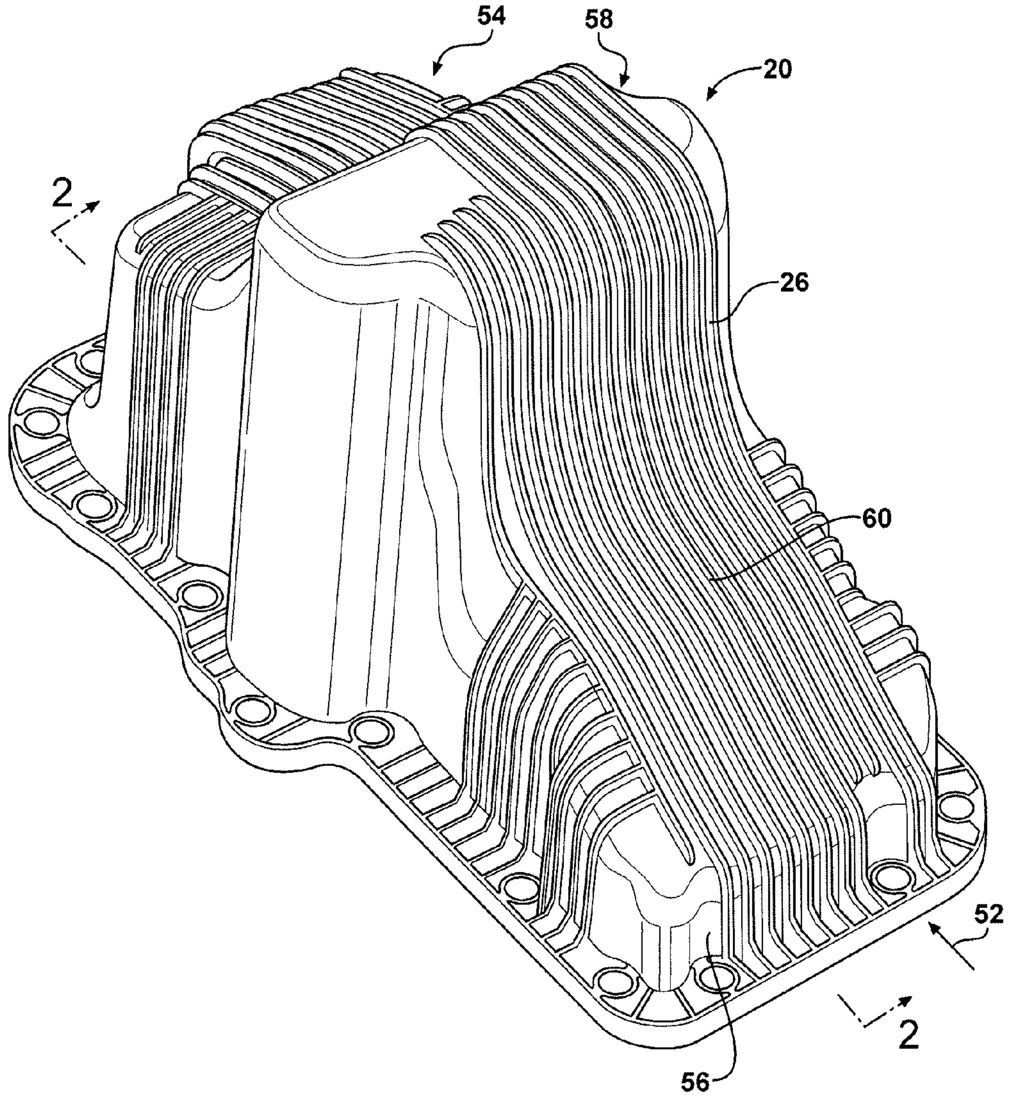
FIG. 1 is a perspective view of an exterior surface of a article incorporating a plurality of ribs according to the subject invention.

Referring to the Figures, wherein like numerals indicate corresponding parts throughout the several views, an article is shown generally at 20. Preferably, the article 20 is manufactured from a polymeric material, i.e., a plastic material. In the context of the present invention, it should be understood that the polymeric material can be neat, i.e., virgin, uncompounded resin, or that the polymeric material can be an engineered product where the resin is compounded with other components, for example with select additives to improve certain physical properties. Such select additives include, but are not limited to, lubricants, non-fiber impact modifiers, fiber-based impact resistance additives, coupling agents, and colorants, such as pigments and the like.

The polymeric material includes a polyamide, which is typically present in an amount of from about 35 to about 70, more typically from about 45 to about 65, and even more typically from about 50 to about 60 parts by weight based on a total weight of the polymeric material. When the polymeric material is a polyamide, the polyamide is selected from the group of polyamide 6, polyamide 6,6, polyamide 46, polyamide 6,10, polyamide 6I,6T, polyamide 11, polyamide 12, polyamide 1010, polyamide 6,12, and combinations thereof. However, it should be understood that polymeric materials other than polyamides may also be used to manufacture the article 20. An example of a suitable polyamide for the present invention includes Ultramid® B27 E 01 commercially available from BASF Corporation, 100 Campus Drive, Florham Park, N.J.

The polymeric material typically comprises a reinforcing agent for imparting rigidity to the polymeric material. When employed, the reinforcing agent is typically present in an amount of from about 15 to about 60, more typically from about 25 to about 50, and even more typically from about 30 to about 40 parts by weight based on a total weight of the polymeric material. Typically, the reinforcing agent is a plurality of fibers 22. However, it is to be appreciated that the reinforcing agent can be selected from the group of fibers 22, particulate fillers, and combinations thereof. Examples of suitable particulate fillers include, but are not limited to, wollastonite, calcium carbonate, calcium sulfate, kaolin, mica, silica, talc, and alumina silicate. Typically, the fibers 22 are glass fibers; however, it should be appreciated that the fibers 22 may be other materials, such as carbon, stainless steel, polymeric, sisal, or boron. It is to be understood that the fibers 22 may vary in size (e.g. length, diameter, etc.) and may be coated or uncoated. For example, in one embodiment, it is preferred that the fibers have an average diameter of less than 13 microns. In other embodiments, it is preferred that the fibers have an average diameter of 10 microns or less. The polymeric material or the fibers 22 themselves may include other components to encourage bonding between the polymeric material itself and the fibers 22. An example of suitable fibers 22 for the present invention includes Chop-Vantage® HP 3660 commercially available from PPG Industries Inc., One PPG Place, Pittsburgh, Pa. 15272.

The polymeric material typically comprises an impact modifier for imparting excellent impact resistance to the polymeric material. When employed, the impact modifier is typically present in an amount of from about 1 to about 20, more typically from about 3 to about 12, and even more typically from about 4 to about 10 parts by weight based on a total weight of the polymeric material. The impact modifier is selected from the group of elastomers, ionomers, ethylene copolymers, ethylene-propylene copolymers, ethylene-propylene-diene terpolymers, ethylene-octene copolymers, ethylene-acrylate copolymers, styrene-butadiene copolymer, styrene-ethylene/butylene-styrene terpolymers and combinations thereof. Typically, the impact modifier comprises at least one of ethylene octene, ethylene propylene, and combinations thereof. An example of a suitable impact modifier for the present invention is FUSABOND® grade N493D commercially available from DuPont Company, Lancaster Pike & Route 141, Wilmington, Del. 19805.

Although not required, the polymeric material may comprise a heat stabilizer for imparting resistance to thermal degradation of the polymeric material. When employed, the heat stabilizer is typically present in an amount of from about 0.01 to about 1, more typically, from about 0.01 to about 0.6, and even more typically from about 0.08 to about 0.2 parts by weight based on a total weight of the polymeric material. The heat stabilizer is selected from the group of organic heat stabilizers, inorganic heat stabilizers, and combinations thereof. Typically, the heat stabilizer comprises at least one of cuprous iodide, potassium iodide, potassium bromide, and combinations thereof. An example of a suitable heat stabilizer for the present invention is Iodeal™ cuprous iodide commercially available from Ajay North America, 1400 Industry Road, Powder Springs, Ga. 30127.

Although not required, the polymeric material may comprise a lubricating agent for allowing the polymeric material to be removed from a mold during formation of the article 20. When employed, the lubricating agent is typically present in an amount of from about 0.01 to about 1, more typically, from about 0.1 to about 0.8, and even more typically from about 0.2 to about 0.6 parts by weight based on a total weight of the polymeric material. The lubricating agent is selected from the group of hydrocarbon wax, paraffins, metal soaps, saturated and unsaturated fatty acids, fatty alcohols, esters, amides, and combinations thereof. Typically, the lubricating agent comprises N,N'-ethylene bis-stearamide. An example of a suitable lubricating agent for the present invention is Acrawax® C commercially available from Lonza Incorporated, 17-17 Route 208, Fair Lawn, N.J. 07410.

Although not required, the polymeric material may comprise a colorant component for modifying a pigment of the polymeric material. When employed, the colorant component is typically present in an amount of from about 0.01 to about 1, more typically, from about 0.1 to about 0.8, and even more typically from about 0.15 to about 0.4 parts by weight based on a total weight of the polymeric material. An example of a suitable colorant component for the present invention is Orient Nigrosine Base SAPL commercially available from Orient Corporation of America, 1700 Galloping Hill Road, Kenilworth, N.J. 07033.

The polymeric material should be resistant to fracturing upon impact with an object, such as a stone, over a wide range of temperatures varying in the ranges of minus 40° C. to 150° C. Although not required, the polymeric material preferably has a modulus of elasticity (Young's Modulus) in the range of 3,500 MPa and 10,000 MPa. The polymeric material also preferably has a particular strength. The strength of the polymeric material may comprise a fatigue strength, a drop weight impact strength, and/or a notched impact strength. The fatigue strength is preferably in the range of 30 MPa and 60 MPa. The drop weight impact strength is preferably in the range of 75 kJ/m2 and 110 kJ/m2. The notched impact strength is preferably in the range of 15 kJ/m2 and 35 kJ/m2. An example of a suitable polymeric material for the present invention is Ultramid® B3ZG7 OSI commercially available from BASF Corp.

As shown in FIG. 1, the article 20 may be formed as a fluid reservoir, and more specifically, the article 20 may be formed as an oil pan for an engine of a vehicle such as an internal combustion engine. It should be understood that the article 20 may be formed into something other than the fluid reservoir and still fall within the scope of the disclosure, such as a gas tank, an engine coolant overflow tank, power steering fluid reservoir, etc. Additionally, it should be understood that the article 20 may be for any type of vehicle, such as an automobile, a boat, a plane, a tractor, etc. Depending upon the specific use of the article 20, the article 20 may have to meet specific impact resistance design requirements. In other words, the article 20 may need to include an impact resistance capable of absorbing a predetermined force. For example, the article 20 should be able to absorb an impact force transferred to the article 20 from the impact force of the object that is below the predetermined force without failing.

The article 20 includes at least one exterior surface 24 having an impact portion 50 disposed between a leading portion 52 and a trailing portion 54. Additionally, the exterior surface may include a planar portion such that any of the impact portion 50, leading portion 52, and trailing portion 54 may include the planar portion. Generally, when the article 20 is coupled to the vehicle, the leading portion 52 faces a front of the vehicle and the trailing portion 54 faces a rear of the vehicle. The leading portion 52 includes a wall 56 coupled to the impact portion 50 of the exterior surface 24 for coupling the article 20 to the vehicle. The wall 56 spaces the impact portion 50 of the exterior surface 24 from the vehicle when the article 20 is mounted to the vehicle. Typically, the wall 56 has a length L of from about 1 to about 400 and more typically of from about 50 to about 250 mm. The trailing portion 54 includes a reservoir portion 58 defining a depth D of the article that is greater than the length L of the wall 56. The impact portion 50 is coupled to the reservoir portion 58 and the wall 56 for providing a transition between the leading portion 52 and the trailing portion 54. As the transition between the leading and trailing portions 52, 54 of the article, the impact portion 50 of the exterior surface 24 is the most likely portion of the exterior surface 24 to be impacted by the object. As such, it is advantageous to provide the impact portion 50 with increased impact resistance.

The impact portion 50 of the exterior surface 24 defines an arcuate configuration 60 protruding outwardly from the article 20. For example, the arcuate configuration 60 has a radius R protruding outwardly in a direction away from the vehicle when the article 20 is mounted to the vehicle. As a further example, the arcuate configuration 60 protrudes outwardly in a direction opposite to a direction of travel of the object, which may impact the article 20. The arcuate configuration 60 of the impact portion 50 of the exterior surface 24 imparts impact resistance to the exterior surface 24 by minimizing the transfer of the impact force of the object to the article 20. Generally, the transfer of the impact force from the object to the article is the greatest when the object impacts the article perpendicular to the exterior surface 24. The arcuate configuration 60 of the impact portion 50 of the exterior surface 24 prevents the object from perpendicularly impacting the impact portion 50 of the exterior surface 24 thereby minimizing the transfer of the impact force as a portion of the impact force is deflected away from the article 20. As such, the arcuate configuration 60 of the impact portion 50 of the exterior surface 24 minimizes the transfer of the impact force by decreasing the likelihood of the object impacting the impact portion 50 of the exterior surface 24 perpendicularly thereby increasing the impact resistance of the article 20.

Figure 2:
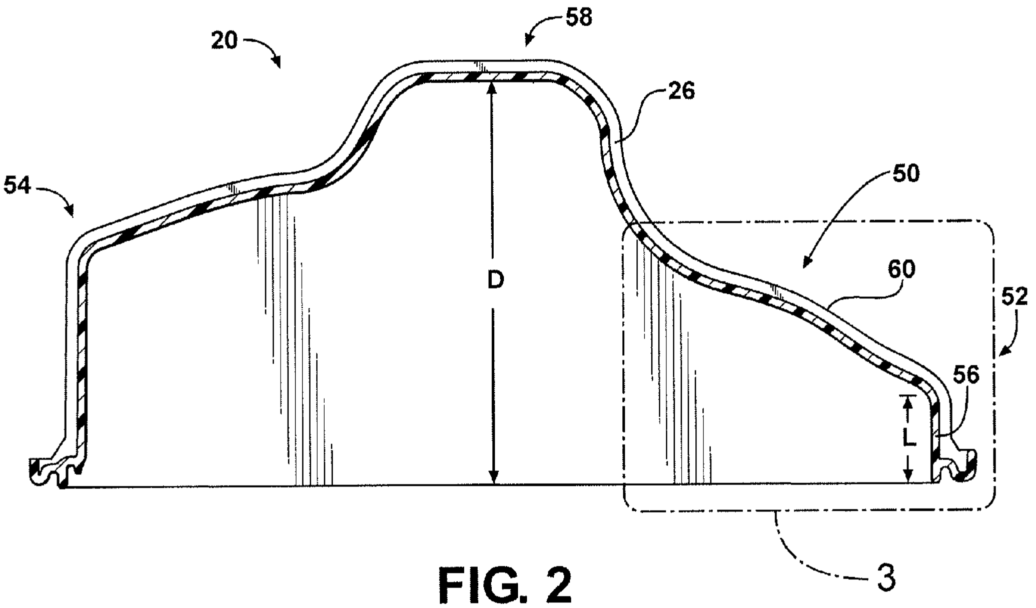
FIG. 2 is a cross section of the article of FIG. 1 taken along line 2-2 shown in FIG. 1.
Figure 3:
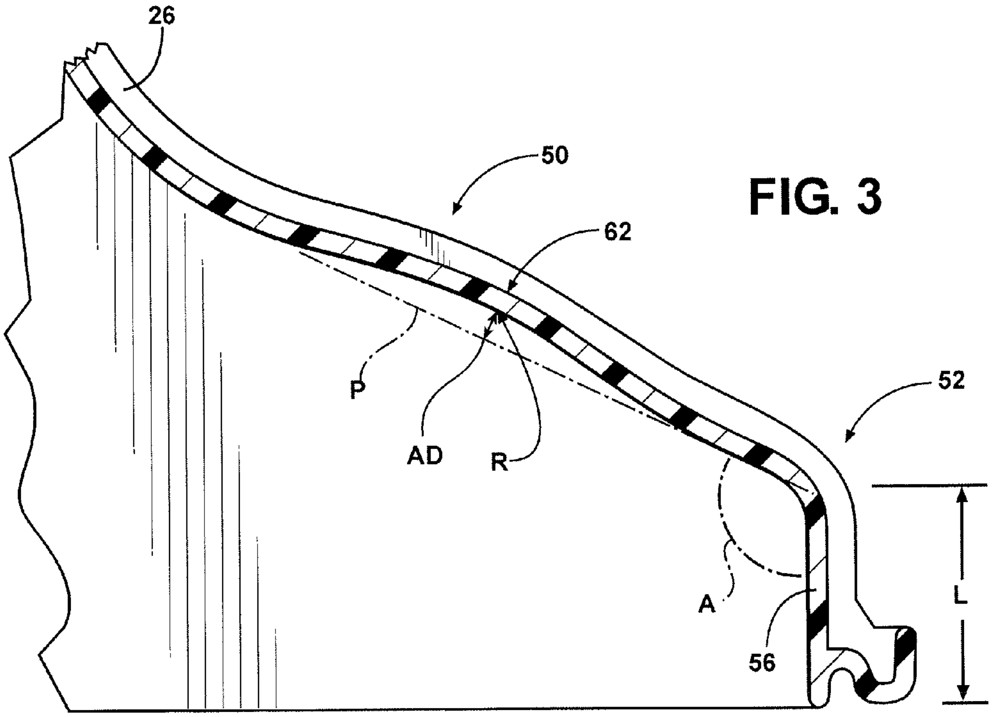
FIG. 3 is a enlarged cross section of a portion of the article of FIG. 2 showing an impact portion of the exterior surface having an arcuate configuration.

Referring to FIGS. 2 and 3, the impact portion 50 defines a plane P that intersects the wall 56 at an angle A typically of from about 90 to about 170, more typically, from about 100 to about 150, and more typically from about 110 to about 130 degrees. The arcuate configuration 60 has an apex 62 spaced from the wall 56 a distance along the plane P defined by the impact portion 50 typically of from about 50 to about 500, more typically from about 100 to about 400, and even more typically from about 200 to about 300 mm. The apex 62 of the arcuate configuration 60 is spaced outwardly from the plane P a distance AD typically of from about 1 to about 50, more typically from about 5 to about 20, and more typically from about 10 to about 15 mm.

The arcuate configuration 60 of the impact portion 50 of the exterior surface 24 also reduces wind noise as air flows across the exterior surface 24 as the vehicle is driven. It is believed that a resonance frequency of the article 20 with the arcuate configuration 60 of the present invention is higher as compared to articles without the arcuate configuration 60. As such, the article 20 is less likely to vibrate as air flows across the exterior surface 24 thereby decreasing the wind noise generated by the article 20.

A plurality of ribs 26 extend from the exterior surface 24. It is to be appreciated that the ribs 26 may be disposed over the entire exterior surface 24 and may be disposed over only a portion of the exterior surface 24 and still fall within the scope of the invention. Each of the ribs 26 includes a pair of side surfaces 28 in spaced parallel relationship and perpendicular to the exterior surface 24. Each of the ribs 26 also includes a top surface 30 spaced from the exterior surface 24 and extending between the pair of side surfaces 28.

Figure 4:
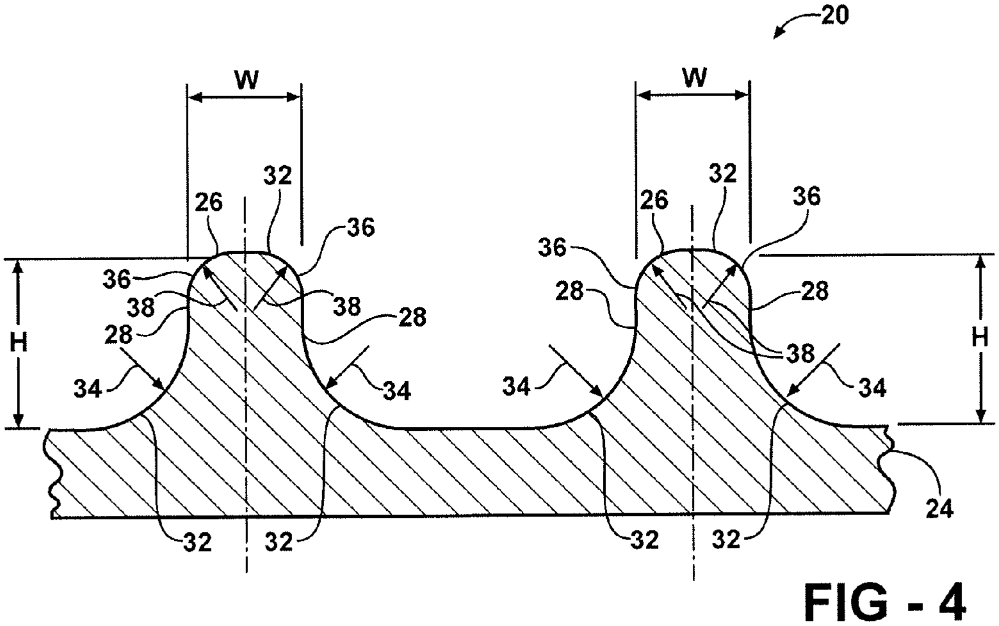
FIG. 4 is a cross section of one embodiment of the ribs of the subject invention.
Figure 5:
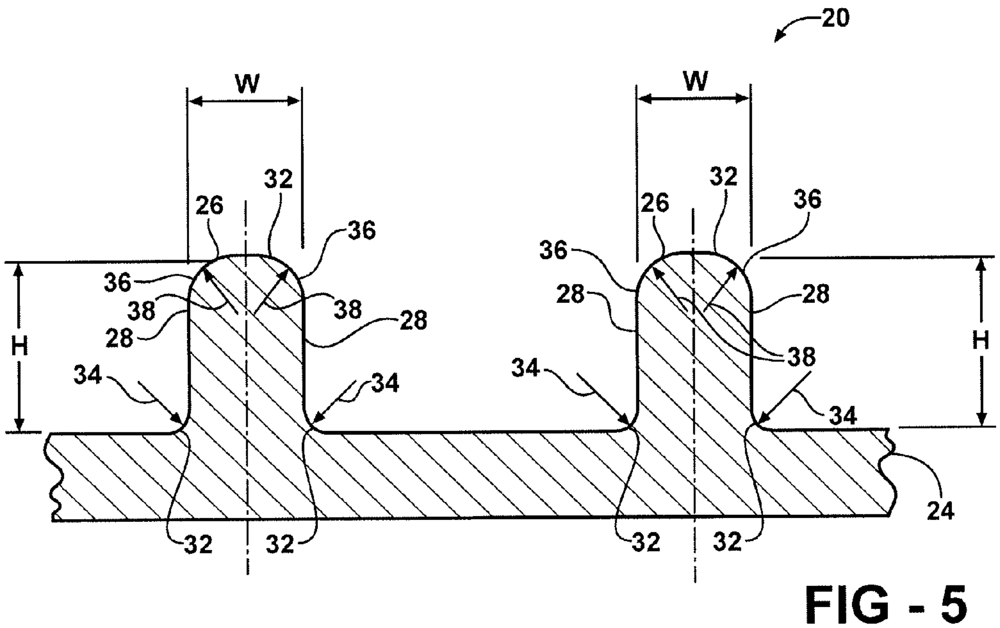
FIG. 5 is a cross section of an alternative embodiment of the ribs of the subject invention.

Referring to FIGS. 4 and 5, a fillet 32 interconnects the exterior surface 24 and each of the side surfaces 28 of the ribs 26. The fillet 32 has a fillet radius 34, which interconnects the side surfaces 28 of the ribs 26 and the exterior surface 24 for spreading the impact force of the impact of the object with the ribs 26 over a larger area of the exterior surface 24. Spreading the impact force over a larger area minimizes the impact force per square millimeter acting on the exterior surface 24 thereby increasing the impact resistance of the article 20. Typically, the fillet radius 34 is less than 2.00 mm, and more typically in the range of 0.75 mm to 2.00 mm. In one embodiment, the fillet radius 34 is equal to 1.5 mm. In another embodiment, the fillet radius 34 is less than 0.75 mm. However, it should be appreciated that the fillet radius 34 may vary from the preferred range and still fall within the scope of the invention.

As described above, the article 20 includes, among other possible portions and/or components, the exterior surface 24, the plurality of ribs 26, and the fillet 32, and at least one, if not all, of the exterior surface 24, the plurality of ribs 26, and the fillet 32 are formed from the polymeric material. As the article 20 is manufactured from the polymeric material as described above, it is preferred that the exterior surface 24, the ribs 26, and the fillet 32 are all integrally formed together during the molding process from the polymeric material.

A corner 36 interconnects each of the side surfaces 28 of the ribs 26 and the top surface 30 of the ribs 26. Preferably, each of the corners 36 includes a corner radius 38 in the range of 0.50 mm and 1.00 mm. More preferably, the corner radius 38 is equal to 0.75 mm. However, it should be understood that the corner radius 38 may vary from the preferred range and still fall within the scope of the invention.

The top surface 30 of the ribs 26 is spaced from the exterior surface 24 to define a height H. The height H is preferably in the range of 2.00 mm and 6.00 mm. More preferably, the height H is equal to 3.00 mm. However, it should be appreciated that the height H may vary from the preferred range and still fall within the scope of the invention.

The side surfaces 28 of the ribs 26 are spaced apart from each other to define a width W. The width W is preferably in the range of 2.00 mm and 3.00 mm. More preferably, the width W is equal to 2.20 mm. However, it should be appreciated that the width W may vary from the preferred range and still fall with in the scope of the invention.

An orientation of the ribs 26 relative to an orientation of the fibers 22 in the article 20 affects the impact resistance of the article 20. The fibers 22 substantially align themselves in a primary direction 40 parallel to a flow of the polymeric material when injected into a mold during a molding process. The direction of the polymeric material flow during the molding process, and therefore the direction of the fibers 22 relative to the ribs 26, affects the impact resistance of the article 20. Accordingly, the plurality of ribs 26 includes a geometric orientation 42 relative to the primary direction 40 of the fibers 22.

Referring to FIGS. 6A through 6E, different geometric orientations 42*a*, 42*b*, 42*c*, 42*d*, 42*e* of the ribs 26 relative to the primary direction 40 of the fibers 22 are shown on a plurality test covers. In addition to the geometric orientation of the ribs 26 of the subject invention described above, a geometric configuration 42*a*, 42*b*, 42*c*, 42*d*, 42*e* of the ribs 26 on the exterior surface 24 also improves the impact resistance of the article 20. The geometric configuration of the ribs includes a thickness of the exterior surface 24 equal to 3.00 mm, a rib 26 height H equal to 3.00 mm, a fillet radius 34 equal to 1.50 mm, a rib 26 width W equal to 2.20 mm, a corner radius 38 equal to 0.75 mm and a rib 26 separation distance between parallel rows of ribs 26 of the square grid geometric orientation 42*d* equal to 7.80 mm.

The effectiveness of the different geometric orientations 42*a*, 42*b*, 42*c*, 42*d*, 42*e* of the ribs 26 in increasing the impact resistance of the article 20 is dependent upon the orientation of the ribs 26 relative to the primary direction 40 of the fibers 22 in the article 20. As described above, the strength of the article 20 is greatest when a load is applied in a direction parallel to the primary direction 40 of the fibers 22 and is weakest when the load is applied in a direction perpendicular to the primary direction 40 of the fibers 22. However, the resistance to elongation of the article 20 is greatest when the load is applied in a direction perpendicular to the primary direction 40 of the fibers 22 and is least when the load is applied in a direction parallel to the primary direction 40 of the fibers 22. The impact resistance of the article 20 is dependent upon both the strength and the resistance to elongation. Therefore, the overall increase in impact resistance provided by the ribs 26 is also dependent upon the strength and the resistance to elongation and the interrelationship between the geometric orientations 42*a*, 42*b*, 42*c*, 42*d*, 42*e* of the ribs 26 with respect to the primary direction 40 of the fibers 22 in the article 20.

Figure 6A:
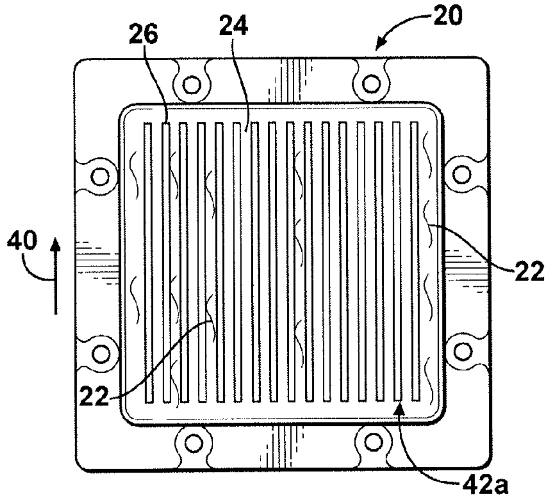
FIG. 6A is a top view of a first alternative geometric orientation of the ribs.
Figure 6B:
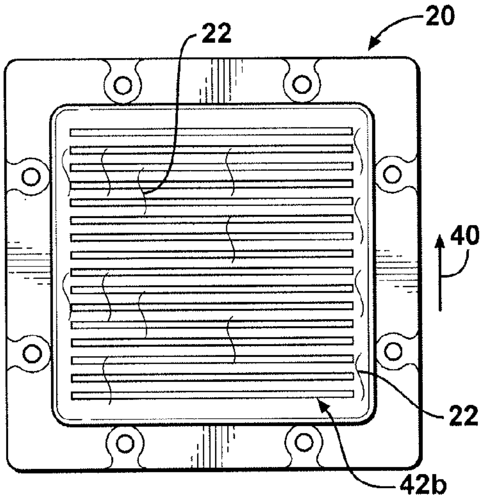
FIG. 6B is a top view of a second alternative geometric orientation of the ribs.
Figure 6C:
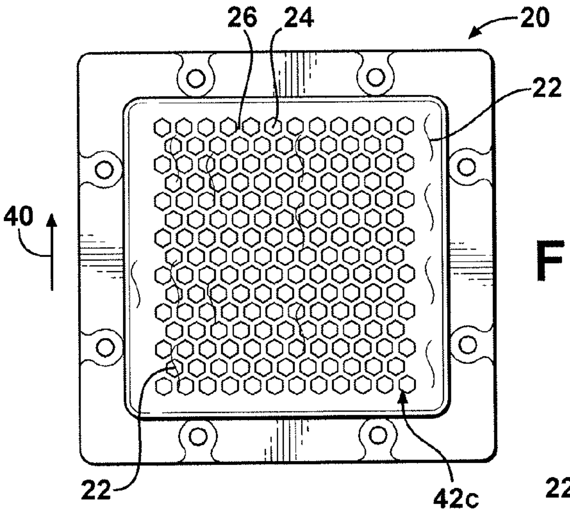
FIG. 6C is a top view of a third alternative geometric orientation of the ribs.

FIG. 6A shows a first geometric orientation 42*a* of the ribs 26 oriented uniaxially parallel to the direction of the polymeric material flow during the molding process, i.e., the ribs 26 are aligned parallel to the primary direction 40 of the fibers 22 in the article 20. Referring also to FIG. 1, the geometric orientation 42*a* of the ribs 26 on the fluid reservoir incorporates the uniaxial orientation parallel to the primary direction 40 of the fibers 22. FIG. 6B shows a second geometric orientation 42*b* of the ribs 26 oriented uniaxially perpendicular to the primary direction 40 of the fibers 22. FIG. 6C shows a third geometric orientation 42*c* of the ribs 26 arranged in a hexagonal (honeycomb) pattern.

Figure 6D:
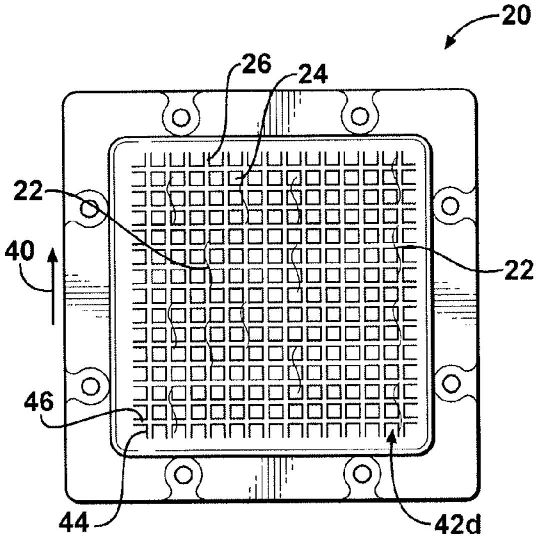
FIG. 6D is a top view of a fourth alternative geometric orientation of the ribs.
Figure 6E:
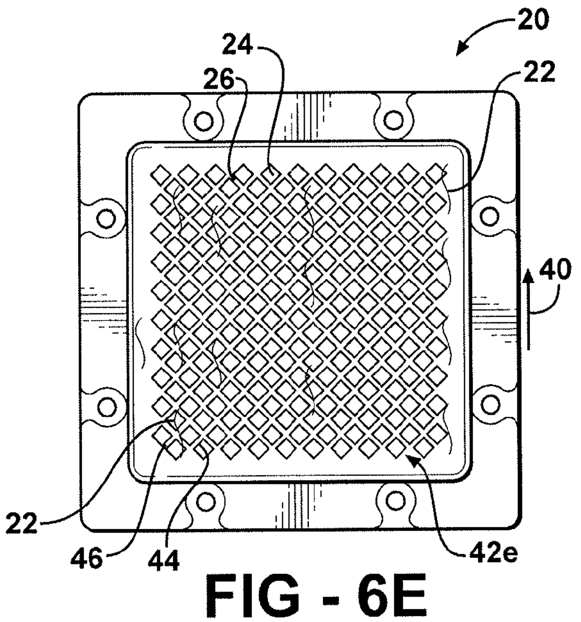
FIG. 6E is a top view of a fifth alternative geometric orientation of the ribs.

The plurality of ribs 26 may include a first portion 44 of the plurality of ribs 26 and a second portion 46 of the plurality of ribs 26. The first portion 44 of the plurality of ribs 26 is arranged perpendicular to the second portion 46 of the plurality of ribs 26. FIG. 6D shows a fourth geometric orientation 42*d* of the ribs 26 oriented in a square grid pattern with the first portion 44 of the plurality of ribs 26 arranged parallel to the primary direction 40 of the fibers 22 and the second portion 46 of the plurality of ribs 26 arranged perpendicular to the primary direction 40 of the fibers 22. FIG. 6E shows a fifth geometric orientation 42*e* of the ribs 26 oriented in a square grid pattern with the first portion 44 of the plurality of ribs 26 arranged at a forty five degree (45°) angle relative to the primary direction 40 of the fibers 22 and the second portion 46 of the plurality of ribs 26 arranged at a forty five degree (45°) angle relative to the primary direction 40 of the fibers 22 and perpendicular to the first portion 44 of the plurality of ribs 26.

Figure 7:
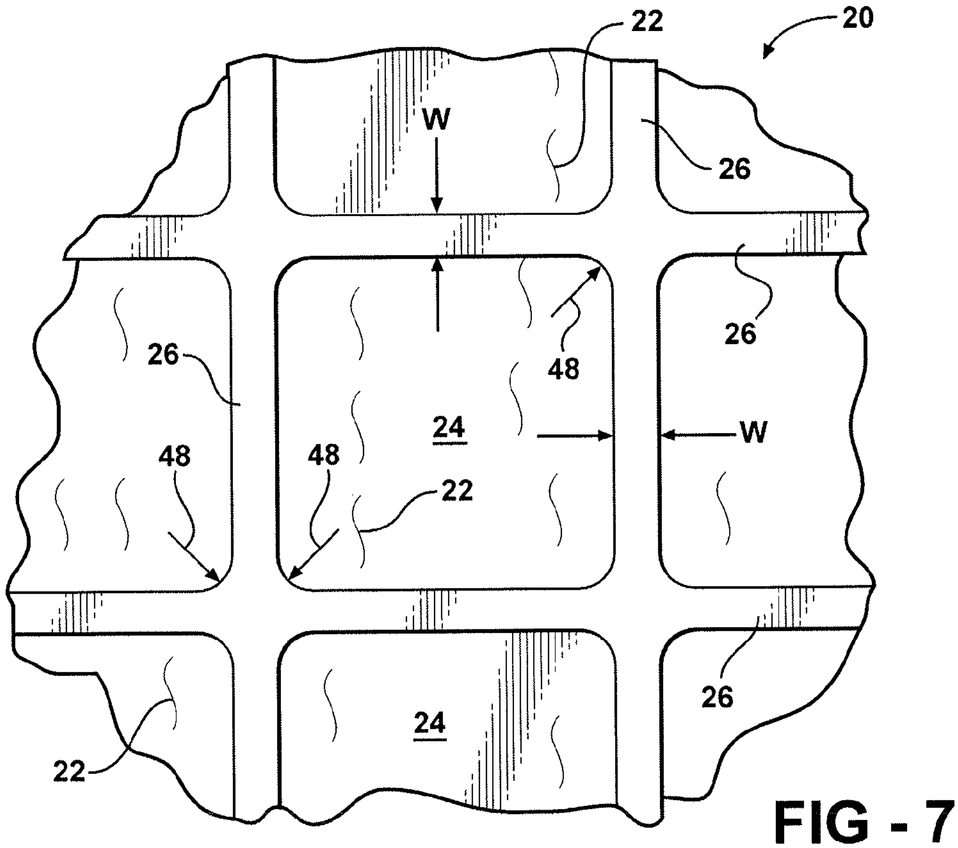
FIG. 7 is an enlarged top view of the fourth alternative geometric orientation of the ribs shown in FIG. 6D.
Figure 8A:
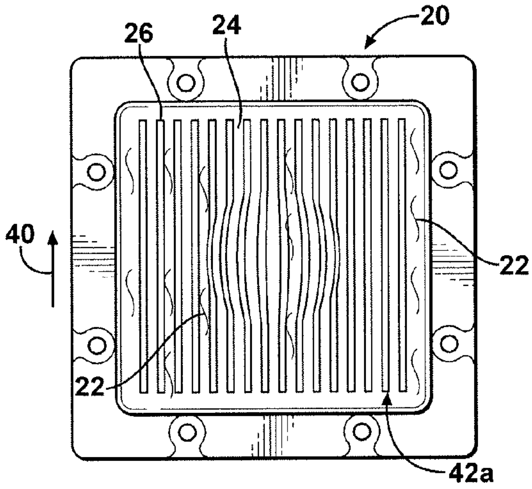
FIG. 8A is a top view of the first alternative geometric orientation of the ribs having the arcuate configuration.
Figure 8B:
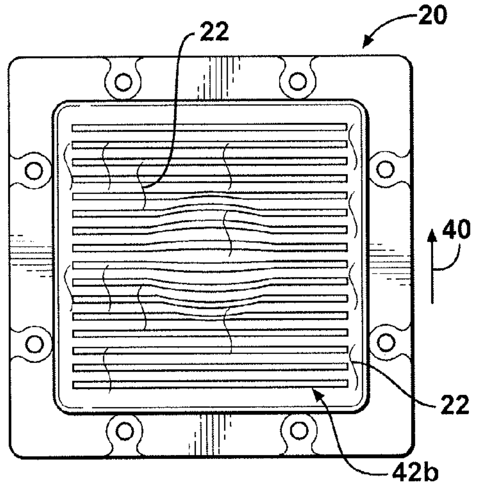
FIG. 8B is a top view of the second alternative geometric orientation of the ribs having the arcuate configuration.
Figure 8C:
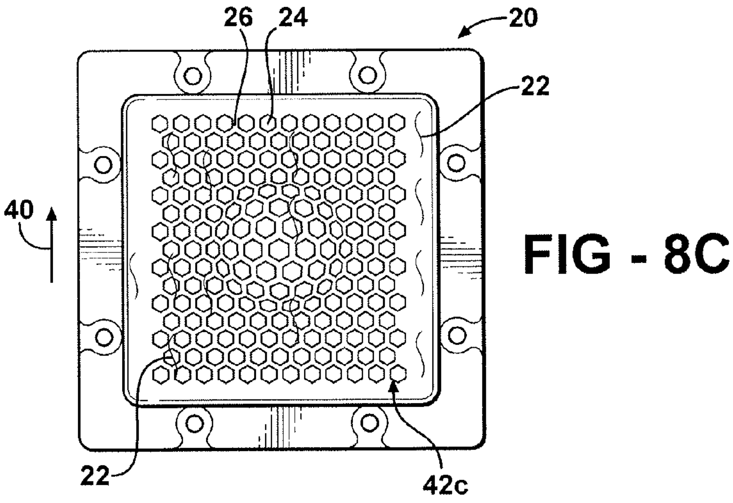
FIG. 8C is a top view of the third alternative geometric orientation of the ribs having the arcuate configuration.
Figure 8D:
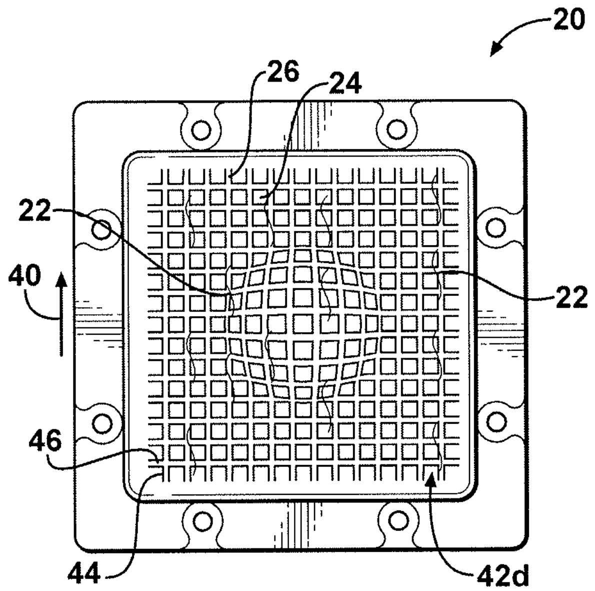
FIG. 8D is a top view of the fourth alternative geometric orientation of the ribs having the arcuate configuration.
Figure 8E:
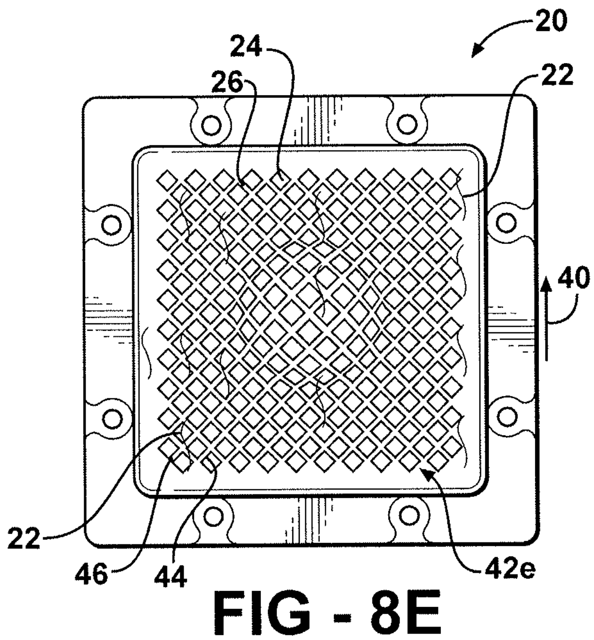
FIG. 8E is a top view of the fifth alternative geometric orientation of the ribs having the arcuate configuration.

Referring to FIG. 7, a top view of the fourth geometric orientations 42*d* shown in FIG. 6D is shown. An intersection between the first portion 44 of the plurality of ribs 26 and the second portion 46 of the plurality of ribs 26. The intersection between the first portion 44 of the plurality of ribs 26 and the second portion 46 of the plurality of ribs 26 includes a top radius 48 preferably in the range of 0.50 mm and 1.50 mm.

More preferably, the top radius 48 is equal to 0.75 mm. However, it should be appreciated that the top radius 48 may vary from the preferred range and still fall within the scope of the invention.

FIGS. 8A through 8E show the different geometric orientations 42*a*, 42*b*, 42*c*, 42*d*, 42*e* of the ribs 26 relative to the primary direction 40 of the fibers 22 combined with the arcuate configuration. It is believed that employing the combination of the arcuate configuration 60, the ribs 26 with the fourth geometric orientation 42*d*, and the Ultramid® B3ZG7 OSI, will maximize the impact resistant of the article 20. Specifically, the arcuate configuration 60 of the impact portion 50 of the exterior surface 24 increases the impact resistance by deflecting the object for minimizing the transfer of the impact force of the object impacting the impact portion 50 which minimizes the impact force the article 20 must absorb without failure by cracking.

Figure 9:
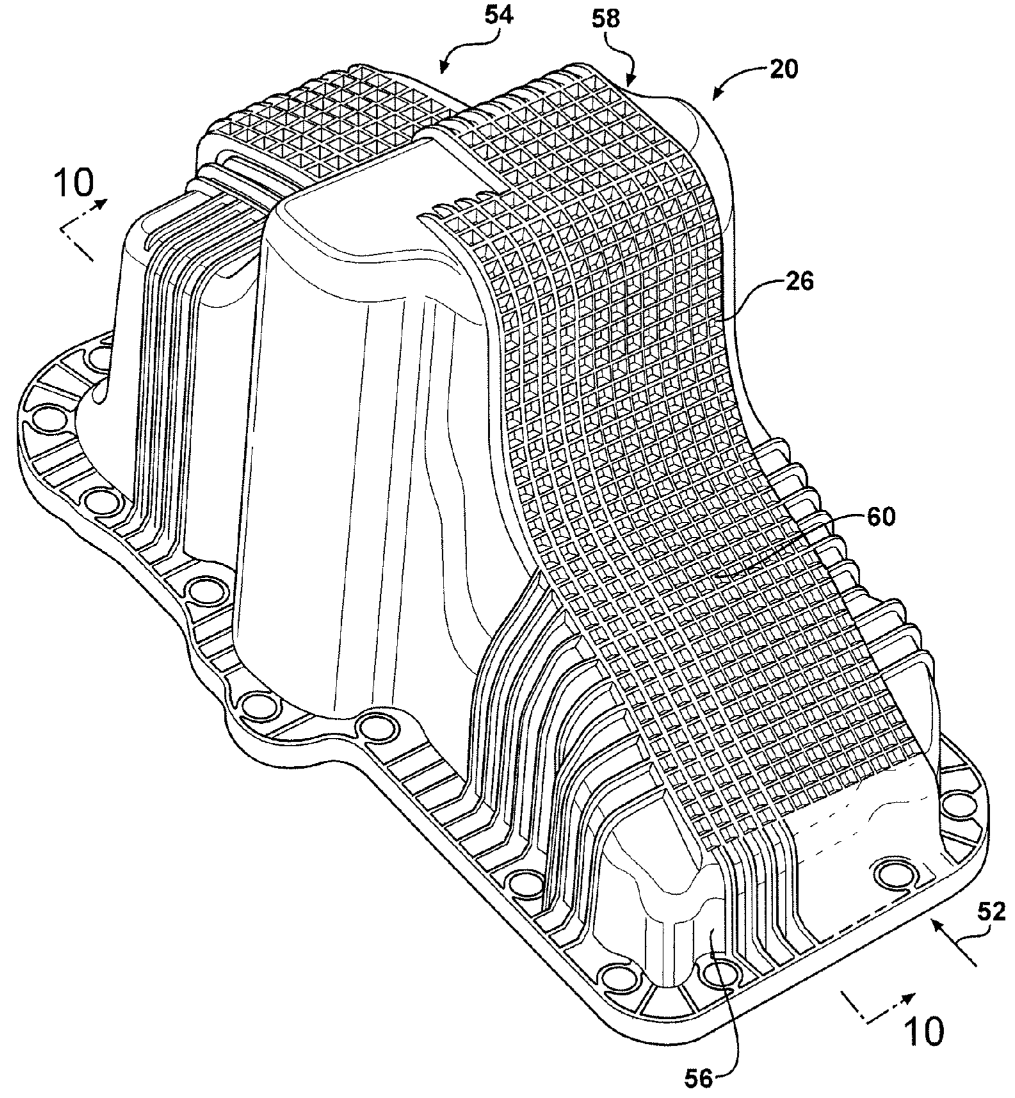
FIG. 9 is a perspective view of an exterior surface of a article incorporating the plurality of ribs in the fourth alternative geometric orientation.

FIGS. 9-11 show the article 20 having the ribs 26 in the fourth geometric orientations 42*d*.

The following examples are intended to illustrate and are not intended to limit the invention.

EXAMPLES

A first set of impact tests are conducted to determine which of the geometric orientation 42*a*-42*e* of the ribs 26 provided the greatest impact resistance. At least one ribbed plaque is made for each of the geometric orientations 42*a*-42*e* of the ribs 26. The ribbed plaques are shown in FIGS. 6A-6E. Each of the ribbed plaques is mounted to an aluminum frame. An impactor, controlled by a pneumatic cylinder, is accelerated to strike the center of the ribbed plaques. The impactor is a semi-spherical tip, with a 25 mm diameter and weight of 103 g. A velocity sensor measures the speed of the impactor. The speed of the impactor is increased in 5 mile per hour increments until cracks in the ribbed plaques are observed. As a result of the first set of impact tests, it was demonstrated that the ribbed plaque having ribs 26 with the fourth geometric orientation 42*d* (shown in FIG. 6D) was able to resist the highest speed impact before failure.

A second set of impact tests are conducted to determine the benefits of using impact modified materials and ribs 26 having the fourth geometric orientation 42*d*. A first comparison test plaque is made from Ultramid® A3WG7 BK564, which is a polyamide 6,6 material reinforced with 35% fiberglass. The first comparison test plaque does not include the ribs 26. A second comparison test plaque is made from Ultramid® B3ZG7 OSI, which is a polyamide 6 material with an impact modifier. The second comparison test plaque does not include the ribs 26. A third comparison test plaque having the ribs 26 in the fourth geometric orientation 42*d* is made from Ultramid® A3WG7 BK564. A fourth comparison test plaque having the ribs 26 in the fourth geometric orientation 42*d* is made from Ultramid® B3ZG7 OSI.

The first, second, third, and fourth comparison test plaques are mounted to the aluminum frame. The impactor, controlled by the pneumatic cylinder, is accelerated to strike the center of the comparison test plaques. The velocity sensor measures the speed of the impactor. The speed of the impactor is increased in 5 mile per hour increments until cracks in the comparison test plaques are observed.

The second set of impact testing results in the first comparison test plaque fails at about 3.8 Joules of force. The second comparison test plaque fails at about 9.7 Joules of force. Therefore, the use of the impact modified Ultramid® B3ZG7 OSI material in the second comparison test plaque results in an improved strength of about 255% as compared to the first comparison test plaque. The third comparison test plaque fails at about 22.9 Joules of force. The fourth comparison test plaque fails at about 44.9 Joules force. Therefore, the use of the impact modified Ultramid® B3ZG7 OSI material and the ribs 26 in the fourth geometric orientation 42*d* results in an improved strength of about 1181% compared to the first comparison test plaque and about 196% compared to the third comparison test plaque.

A fifth comparison test plaque and a sixth comparison test plaque each having the ribs 26 in the fourth geometric orientation 42*d* are made from Ultramid® B3ZG7 OSI. The fifth and sixth comparison test plaques are aged by heating the fifth and sixth comparison test plaques for 700 hours at a temperature of one hundred and fifty degrees Celsius (150° C.). Impact testing according the method set forth above is conducted on the fifth comparison test plaque at twenty-three degrees Celsius (23° C.). The fifth comparison test plaque fails at about 49 Joules of force. Impact testing according to the method set forth above is conducted on the sixth comparison test plaque at minus forty degrees Celsius (−40° C.). The sixth comparison test plaque fails at about 36 Joules of force.

Impact testing according the method set forth above is conducted on a standard prior art oil pan manufactured from cast aluminum at twenty-three degrees Celsius (23° C.). The cast aluminum oil pan fails at about 25 Joules of force, which is about 24 Joules less than the fifth comparison test plaque, which was heat aged and was made from the impact modified Ultramid® B3ZG7 OSI material and had the ribs 26 in the fourth geometric orientation 42*d*. The cracking of the cast aluminum oil pan was confirmed by filling the cast aluminum oil pan with oil and if the oil leakage after 10 minutes then the cast aluminum oil pan is considered cracked.

The invention has been described in an illustrative manner, and it is to be understood that the terminology, which has been used, is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An impact resistant article comprising:

an exterior surface having an impact portion disposed between a leading portion and a trailing portion, wherein said leading portion includes a wall and wherein said impact portion comprises a pair of end portions, wherein said pair of end portions defines a plane extending tangentially to each of said end portions and not intersecting said impact portion between said pair of end portions;

a plurality of ribs extending outwardly from said exterior surface;

said plurality of ribs including a top surface and a pair of side surfaces in spaced and parallel relationship and perpendicular to said exterior surface;

a fillet interconnecting said exterior surface and each of said pair of side surfaces;

wherein said impact portion of said exterior surface defines an arcuate configuration between said pair of end portions protruding outwardly for imparting impact resistance to said impact portion, and wherein said arcuate configuration has an apex spaced from said wall and wherein said apex is also spaced from said plane, and wherein said plane intersects said wall at an angle of from about 100 to about 150 degrees.

2. An article as set forth in claim 1 wherein said apex of said arcuate configuration is spaced from said wall at a distance along said plane of from about 50 to about 500 mm.

3. An article as set forth in claim 2 where said apex of said arcuate configuration is spaced from said plane a distance of from about 1 to about 50 mm.

4. An article as set forth in claim 1 wherein said fillet has a fillet radius in the range from about 0.75 to about 2.00 mm.

5. An article as set forth in claim 1 wherein said fillet has a radius of less than about 0.75 mm.

6. An article as set forth in claim 1 wherein at least one of said exterior surface, said plurality of ribs, and said fillet are formed from a polymeric material.

7. An article as set forth in claim 6 wherein said exterior surface, said plurality of ribs, and said fillet are integrally formed together from said polymeric material.

8. An article as set forth in claim 7 wherein said polymeric material includes a polyamide.

9. An article as set forth in claim 8 wherein said polyamide is selected from the group of polyamide 6, polyamide 6,6, polyamide 46, polyamide 6,10, polyamide 6I,6T, polyamide 11, polyamide 12, polyamide 1010, polyamide 6,12, and combinations thereof.

10. An article as set forth in claim 7 further comprising a reinforcing agent filling said polymeric material in an amount of from 15 to 60 parts by weight based on a total weight of said polymeric material.

11. An article as set forth in claim 10 wherein said reinforcing agent comprises fibers.

12. An article as set forth in claim 9 wherein said polymeric material has a modulus of elasticity in the range of 3,500 MPa and 10,000 MPa and a fatigue strength in the range of 30 MPa and 60 MPa.

13. An article as set forth in claim 9 wherein said polymeric material has a drop weight impact strength in the range of 75 $KJ/m^2$ and 110 $KJ/m^2$ and a notched impact strength in the range of 15 $KJ/m^2$ and 35 $KJ/m^2$.

14. An article as set forth in claim 1 further comprising a corner interconnecting said top surface and each of said pair of side surfaces and having a corner radius in the range from about 0.50 to about 1.00 mm.

15. An article as set forth in claim 1 wherein said top surface is parallel to and spaced from said exterior surface a height in the range from about 2.00 to about 6.00 mm.

16. An article as set forth in claim 1 wherein said pair of side surfaces are spaced from each other a width in the range from about 2.00 to about 3.00 mm.

17. An impact resistant oil pan comprising:

an exterior surface having an impact portion disposed between a leading portion and a trailing portion, wherein said leading portion includes a wall and wherein said impact portion comprises a pair of end portions, wherein said pair of end portions defines a plane extending tangentially to each of said end portions and not intersecting said impact portion between said pair of end portions;

a plurality of ribs extending outwardly from said exterior surface;

said plurality of ribs including a top surface and a pair of side surfaces in spaced and parallel relationship and perpendicular to said exterior surface;

a fillet interconnecting said exterior surface and each of said pair of side surfaces and having a fillet radius in the range from about 0.75 to about 2.00 mm;

said exterior surface, said plurality of ribs and said fillet being integrally formed from a polymeric material filled with a reinforcing agent in an amount of from about 15 to 60 parts by weight based on a total weight of said polymeric material;

said reinforcing agent comprising fibers that are substantially oriented in a primary direction with said plurality of ribs including a geometric orientation relative to said primary direction;

wherein said impact portion of said exterior surface defines an arcuate configuration between said pair of end portions protruding outwardly for imparting impact resistance to said impact portion, wherein said arcuate configuration has an apex spaced from said wall and wherein said apex is also spaced from said plane, and wherein said plane intersects said wall at an angle of from about 100 to about 150 degrees.

18. An oil pan as set forth in claim 17 wherein said apex of said arcuate configuration is spaced from said wall at a distance along said plane of from about 50 to about 500 mm.

19. An oil pan as set forth in claim 18 where said apex of said arcuate configuration is spaced from said plane a distance of from about 1 to about 50 mm.

20. An oil pan as set forth in claim 17 wherein said geometric orientation of said plurality of ribs includes said plurality of ribs extending parallel to said primary direction.

21. An oil pan as set forth in claim 17 wherein said geometric orientation of said plurality of ribs includes said plurality of ribs extending perpendicular to said primary direction.

22. An oil pan as set forth in claim 17 wherein said geometric orientation of said plurality of ribs includes said plurality of ribs arranged to define a plurality of hexagonal shapes.

23. An oil pan as set forth in claim 17 wherein said plurality of ribs includes a first portion of said plurality of ribs and a second portion of said plurality of ribs and wherein said geometric orientation of said plurality of ribs includes said first portion of said plurality of ribs arranged perpendicularly to said second portion of said plurality of ribs.

24. An oil pan as set forth in claim 23 further comprising an intersection between said first portion of said plurality of ribs and said second portion of said plurality of ribs with said intersection including a top radius in the range of 0.50 mm and 1.50 mm.

25. An oil pan as set forth in claim 24 wherein said top radius is equal to 0.75 mm.

26. An oil pan as set forth in claim 23 wherein said geometric orientation of said plurality of ribs includes said first portion of said plurality of ribs arranged parallel said primary direction and said second portion of said plurality of ribs arranged perpendicular to said primary direction.

27. An oil pan as set forth in claim 23 wherein said geometric orientation of said plurality of ribs includes said first portion of said plurality of ribs arranged at a 45° angle relative to said primary direction and said second portion of said plurality of ribs arranged at a 45° angle relative to said primary direction and perpendicular to said first portion of said plurality of ribs.

28. An oil pan as set forth in claim 17 further comprising a corner interconnecting said top surface and each of said pair of side surfaces and having a corner radius in the range of 0.50 mm and 1.00 mm.

29. An oil pan as set forth in claim 28 wherein said corner radius is equal to 0.75 mm.

30. An oil pan as set forth in claim 17 further including a top surface extending between said pair of side surfaces with said top surface parallel to and spaced from said exterior surface a height in the range of 2.00 mm and 6.00 mm.

31. An oil pan as set forth in claim 30 wherein said height between said top surface and said exterior surface is equal to 3.00 mm.

32. An oil pan as set forth in claim 17 wherein said pair of side surfaces is spaced from each other a width in the range of 2.00 mm and 3.00 mm.

33. An oil pan as set forth in claim 32 wherein said width between said pair of side surfaces is equal to 2.20 mm.

34. An oil pan as set forth in claim 17 wherein said fillet radius is equal to 0.75 mm.

35. An oil pan as set forth in claim 17 wherein said polymeric material includes a polyamide.

36. An oil pan as set forth in claim 35 wherein said polyamide is selected from the group of polyamide 6, polyamide 6,6, polyamide 46, polyamide 6,10, polyamide 6I,6T, polyamide 11, polyamide 12, polyamide 1010, polyamide 6,12, and combinations thereof.

37. An oil pan as set forth in claim 35 wherein said polymeric material has a modulus of elasticity in the range of 3,500 MPa and 10,000 MPa and a fatigue strength in the range of 30 MPa and 60 MPa.

38. An oil pan as set forth in claim 35 wherein said polymeric material has a drop weight impact strength in the range of 75 $KJ/m^2$ and 110 $KJ/m^2$ and a notched impact strength in the range of 15 $KJ/m^2$ and 35 $KJ/m^2$.

39. An impact resistant article comprising:

an exterior surface having an impact portion disposed between a leading portion and a trailing portion, wherein said leading portion includes a wall and wherein said impact portion comprises a pair of end portions, wherein said pair of end portions define a plane extending tangentially to each of said end portions and not intersecting said impact portion between said pair of end portions;

a plurality of ribs extending outwardly from said exterior surface with said plurality of ribs including a top surface and a pair of side surfaces in spaced and parallel relationship and perpendicular to said exterior surface; and a fillet interconnecting said exterior surface and each of said pair of side surfaces;

wherein said impact portion of said exterior surface defines an arcuate configuration between said pair of end portions protruding outwardly for imparting impact resistance to said impact portion, and wherein said arcuate configuration has an apex spaced from said wall and wherein said apex is also spaced from said plane, and wherein said plane intersects said wall at an angle of from about 100 to about 150 degrees;

wherein said article is formed from a polymeric material comprising:

a polyamide present in an amount of from about 35 to about 70 parts by weight based on a total weight of said polymeric material;

a reinforcing agent present in an amount of from about 15 to about 60 parts by weight based on a total weight of said polymeric material; and an impact modifier present in an amount of from about 1 to about 20 parts by weight based on a total weight of said polymeric material, wherein said impact modifier is different from said reinforcing agent.

40. An article as set forth in claim 39 wherein said polyamide is selected from the group of polyamide 6, polyamide 6,6, polyamide 46, polyamide 6,10, polyamide 6I,6T, polyamide 11, polyamide 12, polyamide 1010, polyamide 6,12, and combinations thereof.

41. An article as set forth in claim 39 wherein said reinforcing agent is selected from the group of fibers, particulate fillers, and combinations thereof.

42. An article as set forth in claim 41 wherein said reinforcing agent comprises fibers with said fibers substantially oriented in a primary direction.

43. An article as set forth in claim 42 wherein said plurality of ribs includes a first portion of said plurality of ribs arranged parallel said primary direction and a second portion of said plurality of ribs arranged perpendicular to said primary direction.

44. An article as set forth in claim 39 wherein said impact modifier is selected from the group of elastomers, ionomers, and combinations thereof.

45. An article as set forth in claim 44 wherein said impact modifier comprises at least one of ethylene octene, ethylene propylene, and combinations thereof.

46. An article as set forth in claim 39 wherein said polymeric material further comprises a heat stabilizer present in an amount of from about 0.01 to about 1 parts by weight based on a total weight of said polymeric material.

47. An article as set forth in claim 46 wherein said heat stabilizer comprises at least one of copper iodide, potassium iodide, and combinations thereof.

48. An article as set forth in claim 39 wherein said polymeric material further comprises a lubricating agent present in an amount of from about 0.01 to about 1 parts by weight based on a total weight of said polymeric material.

49. An article as set forth in claim 48 wherein said lubricating agent includes ethylenediamine bis-stearamide.

* * * * *